United States Patent
Mayer, III et al.

[11] Patent Number: 6,115,022
[45] Date of Patent: Sep. 5, 2000

[54] METHOD AND APPARATUS FOR ADJUSTING MULTIPLE PROJECTED RASTER IMAGES

[75] Inventors: Theodore Mayer, III, Shadow Hills; Peter J. Inova, Glendale, both of Calif.

[73] Assignee: Metavision Corporation, Burbank, Calif.

[21] Appl. No.: 08/865,854

[22] Filed: May 30, 1997

Related U.S. Application Data

[60] Provisional application No. 60/032,375, Dec. 10, 1996, provisional application No. 60/032,376, Dec. 10, 1996, and provisional application No. 60/032,489, Dec. 10, 1996.

[51] Int. Cl.[7] .................................................. G09G 5/00
[52] U.S. Cl. ........................................ 345/112; 348/383
[58] Field of Search .................................. 345/112, 111, 345/113, 47, 46, 139, 150, 151, 153, 199, 207; 348/383, 576, 577, 597, 687, 688, 744

[56] References Cited

U.S. PATENT DOCUMENTS

| | | | |
|---|---|---|---|
| 4,386,345 | 5/1983 | Narveson et al. | 345/207 |
| 4,468,693 | 8/1984 | Fujita et al. | 358/78 |
| 4,645,319 | 2/1987 | Fekete | 353/31 |
| 4,974,073 | 11/1990 | Inova | 358/87 |
| 4,999,703 | 3/1991 | Henderson | 315/368 |
| 5,136,390 | 8/1992 | Inova et al. | 358/231 |
| 5,335,082 | 8/1994 | Sable | 358/350 |
| 5,384,912 | 1/1995 | Ogrinc et al. | 395/164 |
| 5,446,479 | 8/1995 | Thompson et al. | 345/139 |
| 5,487,665 | 1/1996 | Lechner et al. | 434/44 |
| 5,495,576 | 2/1996 | Ritchey | 395/125 |
| 5,526,051 | 6/1996 | Gove et al. | 348/388 |
| 5,703,621 | 12/1997 | Martin et al. | 345/47 |

*Primary Examiner*—Richard A. Hjerpe
*Assistant Examiner*—Ronald Laneau
*Attorney, Agent, or Firm*—Christie, Parker & Hale, LLP

[57] ABSTRACT

A three dimensional smoothing factors lookup table provides detailed control over the full two dimensional space of a composite image composed of multiple projected raster images. The overall displayed image is improved by adjusting the brightness, gamma, and contrast of individual detail elements of the image according to predetermined smoothing factors. A set of smoothing factors is generated by measuring the reflective brightness of detail elements of the projected image to produce a reflective brightness contour map and mathematically inverting the contour map to produce an inverse map. The inverse map is used as smoothing factors to match the colors output by various projectors in an arrayed projection system. The three dimensional smoothing factors lookup table also enables performance of additional image improvement functions, including projector shading, color shift correction, correction of optical vignetting, and automatic edge definition.

28 Claims, 6 Drawing Sheets

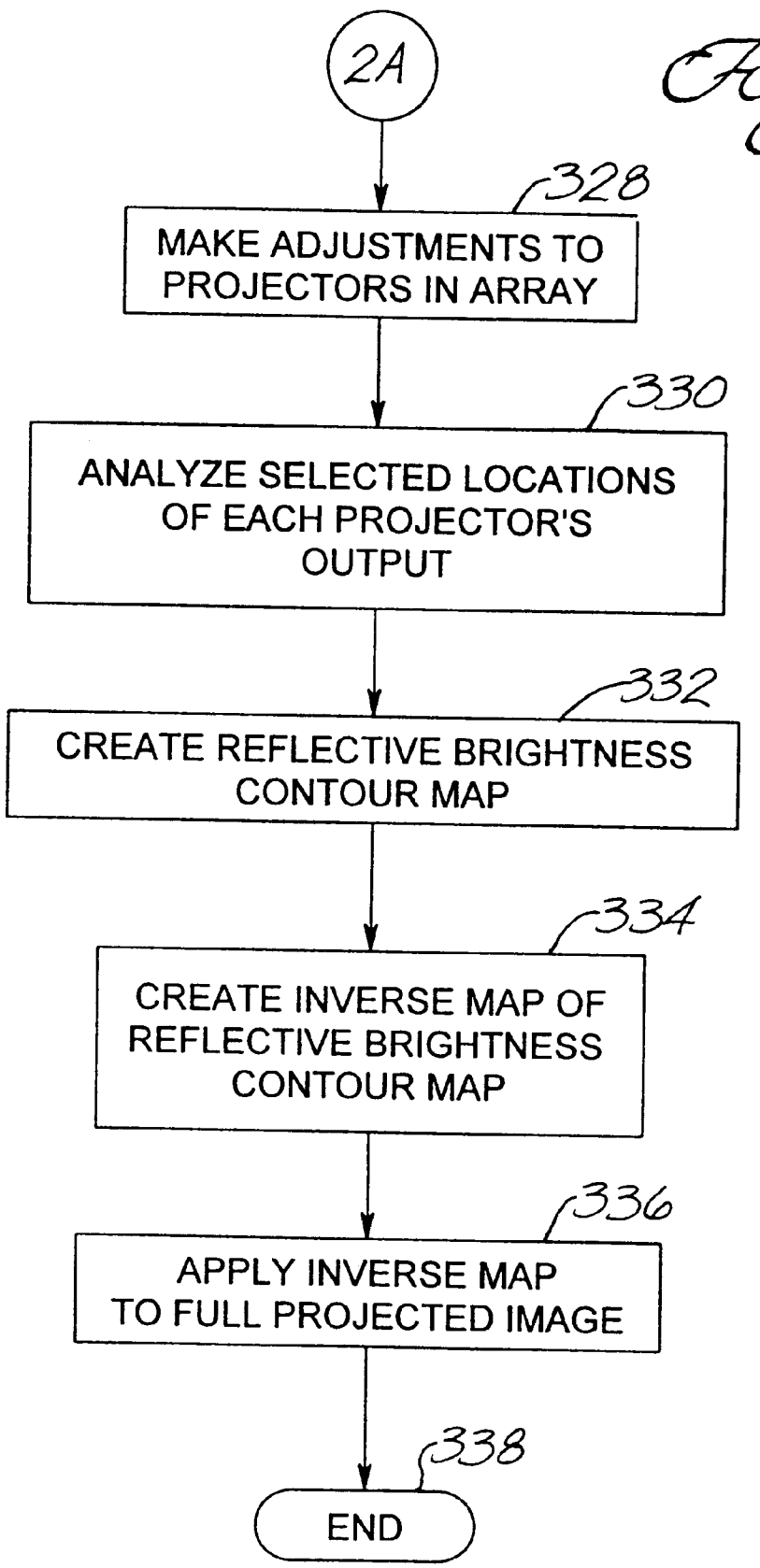

Fig.4B    BRIGHTNESS

METHOD AND APPARATUS FOR ADJUSTING MULTIPLE PROJECTED RASTER IMAGES

CROSS-REFERENCE TO RELATED APPLICATIONS

This patent application claims the benefit of U.S. Provisional Patent Application entitled METHOD OF USING REGISTERED MEMORY ARRAYS TO MATCH COLORS BETWEEN MULTIPLE PROJECTORS, Ser. No. 60/032,375, filed Dec. 10, 1996; U.S. Provisional Patent Application entitled FULL RASTER ADJUSTABLE MULTIPLE IMAGE SMOOTHING METHOD, Ser. No. 60/032,376, filed Dec. 10, 1996, and U.S. Provisional Patent Application entitled METHOD OF AUTOMATICALLY DEFINING THE EDGE OF A RASTER IMAGE FOR MAPPING TO A MEMORY ARRAY, Ser. No. 60/032,489, filed Dec. 10, 1996.

BACKGROUND OF THE INVENTION

This invention relates generally to displaying multiple raster images, and more specifically to a system for adjusting raster images to compensate for projection defects when multiple raster images are displayed together to form a single composite image.

Groups of video projectors can be arrayed into electronic displays that offer larger, brighter, and higher resolution images. A video projector array provides additional benefits such as increased image size without loss of image brightness, increased image resolution, increased depth of focus, and a reduced projection distance. Although matrixed walls of individual video displays are the most common example of electronic image arrays, the limiting factor of traditional video walls is the visual segmentation between the displays. Minimizing the segregation between arrayed images is highly desirable. The goal is to make video arrays wherein the segregation is indistinguishable.

Overlapping and seamlessly blending multiple video projectors into a single composite image goes a long way towards eliminating the segregation of projector elements and opens the way to many new practical applications. This technique is particularly applicable to the display of computer graphics material. Computers have the ability to generate multi-channel composite images at resolutions far exceeding traditional electronic media and even the maximum resolution of any single monitor or projector. These large images can only be displayed using an arrayed system.

The challenge is to make the entire projection array behave as a single image display device. An array can be managed with integrating electronics to create a "virtual" package around multiple projectors, arrayed in adjacent and registered geometries, with the entire package behaving as a single cohesive imaging device.

Existing array formats include edge matched, edge blended, wide field, and matrixed. Edge matched formats rely on clean projection geometries where two projected images are immediately adjacent to one another. Defining a perfect single pixel row edge between projectors is improbable because small variations in the vertical geometry cause small overlaps and brightness aberrations between the images. It is typically better to have a definitive mechanical edge to the image, and it is preferable that there is an actual black separation between the array elements in such applications. The separation serves to mask small misalignments and to provide visual relief between slightly imperfectly tuned edge-matched display components.

Edge blended formats rely on an overlap region with redundant picture information from each projector in the overlap. The overlap region is, therefore, double the brightness of the rest of the image and needs to be blended using an edge blending processor capable of fading down each overlapping edge of the projectors in such a way as to compensate for the gamma (the ratio of input voltage to light output) of the phosphor, light valve or LCD. The goal is a uniform brightness level across the overlap region.

Wide field arrays are an extension of the edge blended format. Wide field arrays use adjacent geometries. The displays are laid out in horizontal patterns to create wide scope images. Alternatively, the projectors may be stacked vertically to create very tall images.

Matrixed arrays organize projectors in XY grids (i.e., they contain multiple displays in the horizontal and vertical directions). Video walls are an example of a matrixed array. The unique challenge in this geometry format is the need for separate soft edge blend control in the corner regions where all four projectors overlap.

The actual projector arrays can consist of any projector scheme, including CRT, light valve, DMD, laser or LCD projectors. Using CRT projectors provides the most flexibility in terms of geometry control but limits each projector array element to the maximum size and brightness of the individual CRT projector. Using bright light valve projectors allows for the expansion of the overall size of the array, and since several light valve imaging schemes are driven by scanning CRTs, these models still allow for good geometry control of the image. LCD projectors have the potential of offering a low maintenance and low cost solution for arrayed projection. LCD projectors, however, have virtually no geometric controls. Since they tend to be single lens devices, this limitation may be overcome in pre-integrated arrayed systems where fixed custom optics can be applied.

Arrayed projection displays typically exhibit various artifacts or defects that are noticeable to the human observer. Such effects as improper projector shading, optical vignetting (also known as "hot spots"), and horizontal color shifting negatively affect the composite image. As arrayed projection displays get larger and include more independent raster images, new techniques are needed to ensure that the composite projected image is of the best quality.

SUMMARY OF THE INVENTION

The present invention is embodied in a new soft edge blending processor and associated software that are capable of affecting all four sides of a projected composite image, thereby enabling the construction of arbitrarily large, seamless projections of raster images. The invention corrects many artifacts in an arrayed projection system that may be perceived by a human observer.

An embodiment of the present invention is a system for adjusting video signals representing an array of raster images to compensate for projection defects when the array of raster images is displayed by a plurality of projectors to form a composite projected image. The system includes a three dimensional array of smoothing factors, each smoothing factor being associated with a portion of the composite projected image; and circuitry for applying the smoothing factors to the video signals to remove the projection defects resulting from display of the array of raster images.

Another embodiment of the present invention is a method of matching arrayed projectors to produce a composite raster image projected by the projectors on a projection screen and having consistent red, green, and blue color values. The method includes the steps of focusing a light sensor on the projection screen, displaying one of the colors by one of the projectors on the projection screen, displaying a pattern of the color by the projector on the projection screen, and collecting measurement data from the light sensor sensing the display by the projector of the pattern. These steps are repeated for each of the colors and for each of the projectors in the projector array. The method continues by generating a behavior profile for each of the projectors and for all projectors combined from the collected measurement data, and adjusting the projectors according to the behavior profiles. Further steps to the method include analyzing selected locations of each projector's projected raster image, creating a reflective brightness contour map representing the reflective brightness of the composite raster image, creating an inverse map of the reflective brightness contour map, and applying the inverse map to the composite raster image.

Still other embodiments of the present invention will become readily apparent to those skilled in the art from the following detailed description, wherein is shown and described only embodiments of the invention by way of illustration of the best modes contemplated for carrying out the invention. As will be realized, the invention is capable of other and different embodiments and its several details are capable of modification in various obvious respects, all without departing from the spirit and scope of the present invention. Accordingly, the drawings and detailed description are to be regarded as illustrative in nature and not as restrictive.

DESCRIPTION OF THE DRAWINGS

FIGS. 2A and 2B are flow diagrams of the steps of operating the present system for adjusting projectors within a projector array.

FIGS. 4A–E are diagrams illustrating the concept of projector matching.

DETAILED DESCRIPTION OF THE INVENTION

Figure 1:
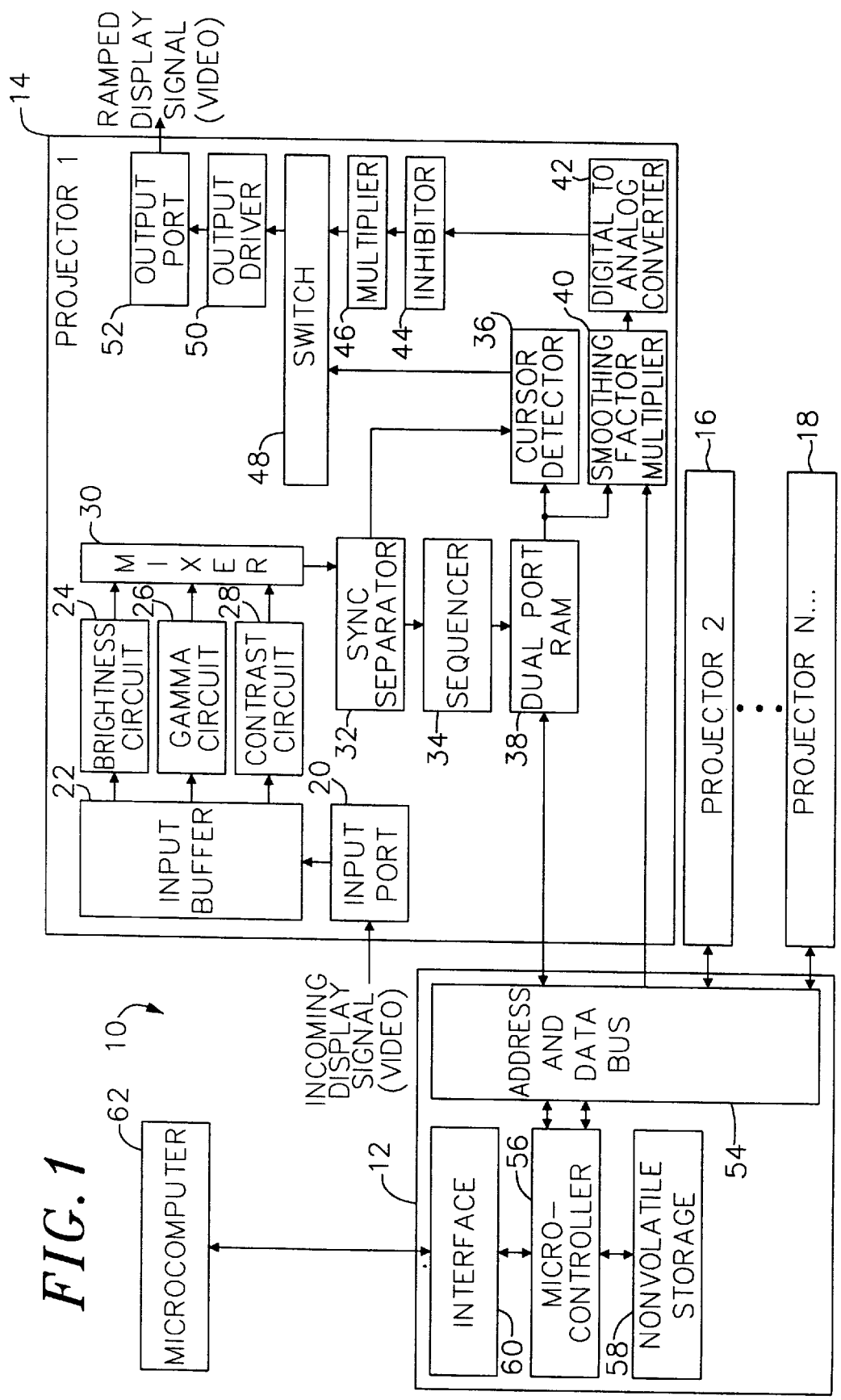
FIG. 1 is a diagram of the system architecture for adjusting multiple projected raster images according to the present invention.

I. A Three Dimensional Smoothing Factors Lookup Table

An Adjustable Multiple Image Display Smoothing Method and Apparatus are disclosed in U.S. Pat. No. 5,136,390, issued to Inova et al., the entire contents of which are herein incorporated by reference. The '390 patent provides a solution to the problem of undesirable aberrations or artifacts present in an image consisting of two or more side-by-side, overlapping displays. The present invention provides the capability to perform edge blending for the edge blended and wide field array formats discussed above. In the '390 patent, consistent image brightness is attained for two overlapping displays by storing a set of smoothing factors, one for each detail element of each image, in a memory. A detail element is defined as being a portion of a video image. The detail element may be a pixel, a portion of a pixel, multiple pixels, or it may be any other size portion of a video image. The set of smoothing factors are defined for each horizontal detail element in a composite image. The smoothing factors are stored as parameters in a one dimensional array in memory and include brightness factors. The resulting array is synchronized with the video image, and the video image is modulated to correspond to the parameters stored in the memory array, thereby removing any brightness-related artifacts.

In one embodiment of the '390 patent, the one dimensional array used for a composite video display has 512 array elements, corresponding to a maximum of 512 smoothing factors stretching horizontally across each image, although other array sizes may also be used. Preferably, a smoothing factor contains at least 8 bits of data. Each individual smoothing factor for a given horizontal detail element is used repeatedly for all vertical scan lines in the image. By using a one dimensional lookup table, and re-addressing it with each video line, the system disclosed in the '390 patent provides very detailed adjustments of the image brightness in overlapping areas. These smoothing factors can be calibrated to the gamma behavior of individual phosphor tubes, light valves, LCDs, etc., as well as used to address a number of other projector aberrations, providing a smooth transfer across an image region. If the image is a color image and is projected using red, green, and blue channels, for example a two dimensional 512 by 3 memory array can be used, whereby an array index is needed for each of the red, green, and blue components of the color image. The length of the array indices is a matter of design choice, with alternate sizes of 128, 256, 1024, 2048, or other values possible. The two dimensional memory array functions as a lookup table and is accessed for each line of video. This technique provides ramping control in overlap regions of multiple projected images, but restricts the control to rectangular regions between the side-by-side displays as shown in FIG. 2 of the '390 patent.

By using a lookup table vertically, it is possible to provide edge blending functions for top and bottom edges of the display instead of, or in addition to, a horizontal lookup table for the left and right edges. A separate horizontal lookup table and vertical lookup table provide some measure of control over all four edges, but does not address the four overlapping corner regions of matrixed arrays of displays.

In an embodiment of the present invention, an improvement to the system disclosed in the '390 patent is provided to extend the smoothing factor lookup table to three dimensions. Instead of having only array indices for the horizontal detail elements of the image and for the red, green and blue values, an additional array index is also used for the vertical detail elements. That is, the smoothing factors lookup table now consists of a M by N by 3 array, where M and N are design choices. For example, the three dimensional smoothing factors lookup table could be 512 pixels by 512 pixels by 3 colors, 1024 pixels by 1024 pixels by 3 colors, or 2048 pixels by 2048 pixels by 3 colors in size. Alternatively, an application of the smoothing factors lookup table may be non-symmetrical, resulting, for example, in an array of 512 pixels by 1024 pixels by 3 colors. Each memory array element defines the smoothing factor on an individual detail element of the full two dimensional image. Thus the level of control is now at each individual detail element of the image instead of at each horizontal line (as in the system disclosed in the '390 patent). The brightness parameters are accessed sequentially with each new line of video indexing the smoothing factors lookup table down the vertical memory locations. If the vertical resolution of the video is more than M, the memory is indexed at a rate that is some multiple of lines. This technique provides a detailed two dimensional shading map or set of smoothness factors for the entire raster image. Again, each location in the smoothing factors lookup table is stored as a word having at least 8 bits. The smoothing factors lookup table provides a detailed matrix of smoothing factors over an entire composite raster image, which provides the core capability for the present system to perform a number of functions besides edge blending. These functions can be applied to correct various projection aberrations that are brightness related.

Now edge blending of the overlapping corner regions of the matrixed arrays of displays can be performed to correct the brightness level in those regions. The byproduct of this advance is that there can now be arbitrarily large arrays of projectors wherein the edge and corner regions are all blended to provide a seamless, integrated large scale image. Large images in formats having any number of displays across and any number of displays down is now possible with segregation between displays eliminated.

FIG. 1 is a diagram of the system architecture for adjusting multiple projected raster images according to the present invention. The system 10 includes a controller card 12 and a plurality of signal adjustment cards, one for each projector in a multiple projector display arrangement. Signal adjustment card 14 is for projector 1, signal adjustment card 16 is for projector 2, and so on to signal adjustment card 18 for projector N. Video signals from video signal generators are received in each card by input port 20. The input port transmits the video signal to an input buffer 22, which conditions the signal, isolates the incoming video line, and performs the necessary buffering. From the input buffer, the signal is transmitted to brightness circuit 24, gamma circuit 26, and contrast circuit 28. Each of these circuits are used to manipulate the associated component of the video signal. Circuits 24, 26, and 28 individually manipulate the incoming display signal to compensate for deficiencies that may later give rise to observable artifacts on the projection screen. Other parallel functions could also be added at this point of the system architecture. The output signals of the brightness circuit 24, gamma circuit 26, and contrast circuit 28 are provided to mixer 30. The mixer 30 combines the output of the isolated functions performed by circuits 24, 26, and 28 back into a single signal. Alternatively, the functions performed by circuits 24, 26, and 28 may be performed serially. The chief advantage of performing these functions in parallel is that although each function's influence is diminished by the number of functions used, there is no cumulative effect on the signal as might be created by any particular sequential ordering of application of the functions. From the mixer, the signal is forwarded to sync separator 32.

The sync separator 32 detects synchronization signals in the video signal and generates a pulse for each synchronization signal. In a standard NTSC video signal, each scan line is preceded by a horizontal synchronization signal. By detecting the horizontal synchronization signals, the sync separator can determine the beginning of each scan line. The sync separator can also detect vertical synchronization signals which mark the beginning of each scan line field. Typically, there are two fields per image. The synch separator generates a different pulse for each vertical synchronization signal. The output of the sync separator is sent to sequencer 34 and cursor detector 36.

The sequencer 34 is used to access one port of a dual port RAM 38. The dual port RAM is of sufficient size to store the three dimensional array comprising the smoothing factors lookup table. Each of the registers in the dual port RAM 38 contains a smoothing factor. Each smoothing factor is associated with a specific detail element in the projected image. The sequencer 34 generates a continuous stream of addresses from the first detail element in an image to the last detail element in an image, accessing a different memory register each time. In an NTSC signal, this is done by having the sync separator 32 detect vertical synchronization signals and send a reset pulse to the sequencer 34 at the start of each new horizontal line in an image. Each smoothing factor is preferably a digital number, the amplitude of which indicates the brightness adjustment or scaling factor which is to be applied to the detail element of the projected image. In one embodiment, the smoothing factor has eight bits, allowing for 255 brightness levels from complete darkness to full brightness, although various other sizes of smoothing factors could be used. The 256th level is a cursor signal. The 8-bit smoothing factor words are sent to cursor detector 36 and smoothing factor multiplier 40.

The smoothing factor multiplier 40 sets the amount of change that each smoothing factor has on underlying image signals. In prior systems, such as the one disclosed in the '390 patent, the multiplier function was fulfilled with a constant factor based on the mathematics of the electronic circuits used and was quite consistent with many projectors' responses. By creating the ability to inject a new multiplier at this step, a greater refinement of projector behavior is attained. The smoothing factors are then sent to a digital to analog converter 42, which converts the digital brightness adjustment word to an analog signal. The analog signal is then sent through inhibitor 44 to multiplier 46 to be multiplied with the appropriate detail element of the projected image. In an NTSC signal there is a time delay between scan lines when the vertical synchronization signal is transmitted. The inhibitor 44 prevents smoothing factors from the digital to analog converter 42 from being applied to the vertical synchronization signals by inhibiting the transmission of the smoothing factors to the multiplier 46. After the next horizontal synchronization signal is received, the inhibitor is shut off and smoothing factors pass to the multiplier 46 for application to the video signal.

After the smoothing factors have been applied in multiplier 46, the adjusted video signal is further transmitted through switch 48 to an output driver 50 which buffers the output signal, matches impedances, and sends it to the output port 52 and on to the corresponding projector. Each signal adjustment card can receive video signals from any source and transmit them to any receiver. While it is presently preferred that the cards be used as a smoothing device in a two-dimensional array of projected images, the cards can also be used during filming, production, post-production, broadcasting or any other step leading to the display of video images.

The signal adjustment card, using the dual port RAM, provides very precise control of the brightness, gamma, and contrast of each individual detail element of the projected image. Conventional digital circuitry is fast enough that all of the brightness ramping can be done in real time in the video signal's path to the projector. Because of the three dimensional smoothing factors lookup table stored in the dual port RAM, brightness adjustments can be made to any portion of a projected image.

The present system can also be adapted for digital video. In such a case, the sync separator detects identification headers for digital pixel words and addresses the appropriate registers in the dual port RAM 38. The dual port RAM transmits the smoothing factors into smoothing factor multiplier 40 which then multiplies the digital smoothing factor word with the digital pixel brightness component, and the composite word is then transmitted via the output port 52. The digital to analog converter 42 is, of course, then unnecessary, although an interpolating device may be desired to generate intermediate smoothing factor words.

It is sometimes desired to show a cursor on the projected image. Therefore, each signal adjustment card includes a cursor detector function. Instead of using all possible 256 levels of brightness adjustment allowed by the 8-bit word in the dual port RAM, only 255 are used. The 256th level is a cursor generator word. When the word 256 occurs at the output of the dual port RAM 38, cursor detector 36, which reads the dual port RAM output, detects the cursor signal word and sends a signal to switch 48. The switch replaces the detail element with which the cursor signal word is associated with a medium white detail element. In this way a white cursor symbol can be shown on the projected image.

By storing a smoothing factor for adjusting the brightness of each detail element in a two dimensional image, the dual port RAM provides very precise control of image brightness. The dual port RAM also allows the smoothing factors lookup table to be easily replaced with different smoothing factors to suit different applications. The other port of the dual port RAM is connected to controller card 12 via an address and data bus 54 which connects the RAM to a microcontroller 56. The microcontroller 56 is, in turn, coupled to a non-volatile storage device 58, and through interface 60, to microcomputer 62.

The smoothing factors are generated by microcomputer 62 according to the methods described in the '390 patent. The microcomputer downloads the smoothing factors for each signal adjustment card through the interface 60 to the microcontroller 56, which then stores the smoothing factors into non-volatile storage 58. When the system is turned on, the microcontroller accesses the smoothing factors in the non-volatile storage and stores them in the appropriate registers in the dual port RAM 38 for each signal adjustment card. As the system is operated, the smoothing factors stored on the dual port RAM for each card are used to adjust the brightness of the images as described above. However, at any time during the device's use, the microcomputer 62 can transmit a new set of smoothing factors to the microcontroller, which then stores the new smoothing factors in the non-volatile storage 58 and in the dual port RAM 38 for the appropriate signal adjustment card.

II. Projector Matching

A new function supported by the three dimensional smoothing factors lookup table and embodied in the present invention is termed "projector matching". This function makes multiple arrayed projectors look and behave in a similar manner when projecting their combined raster images. With the projector matching function, the brightness, contrast and gamma behaviors (as defined by the relationship of electrical input to light output) is controlled for each of the red, green, and blue channels for each projector in the system.

This is accomplished by displaying a special pattern inserted in the present invention's imaging system by a special pattern generator. Next, the output characteristics of each individual projector are measured through a calibrated measuring device (such as a sensitive video camera) and this information is directed to a control computer. A calibrated feedback system is created that, when applied to the three dimensional smoothing factors lookup table of the present system, produces a higher level of refinement and image matching adjustment than can be achieved from the internal adjustment circuits of the individual projectors. The projector matching function masks artifacts and projection aberrations caused by the physics of the projection lenses used and the discontinuously reflective or transmissive portions of the screen used to display the composite raster image.

A smoothing factors lookup table is set up for each projector on each of its red, green, and blue channels. The smoothing factors lookup table is independent of the graphic resolution of the raster image that each projector is portraying. It can be thought of as a control layer existing above the image layer. The smoothing factors lookup table values exist in a fixed location relationship to the underlying image. Hence, it is "in register" with the underlying image and elements of the lookup table influence prescribed locations of the projected raster image.

One way to describe the smoothing factors lookup table is through its characteristic relationship to the projection screen. Projectors may present images in as widely diverse formats as 640 pixels by 480 pixels to 2048 pixels by 2048 pixels, or even larger sizes. These images are typically presented on the same sized screen although the information content of the large resolution format is over a dozen times the information content of the small resolution format. However, the same number of smoothing factors is applied to the underlying video image.

Each element of the smoothing factors lookup table controls a predetermined detail element of the raster image, and circuitry in the present system smoothly transitions the effect of each individual element to the next so that the number of samples in the lookup table behave as "way points" on a two dimensional layer. This layer is used to attenuate the underlying image in such a manner as to modify its appearance on the projection screen. In this application, the modification performs the function of more precisely matching the behavior of one projector to the next in the array of projectors.

The pattern generator in combination with the measuring system allows one to define brightness, contrast, and gamma characteristics for each projector. A reverse function is generated through a comparison step that compares each projector's characteristics to its neighboring projectors in the projector array. Within tolerances determined by the user setting up the projectors for the present system, the measuring system guides user-controlled refinement of projector behavior from the controls available to the circuits internal to the projectors, and then to the refinements available through application of the smoothing factors.

Figure 2A:
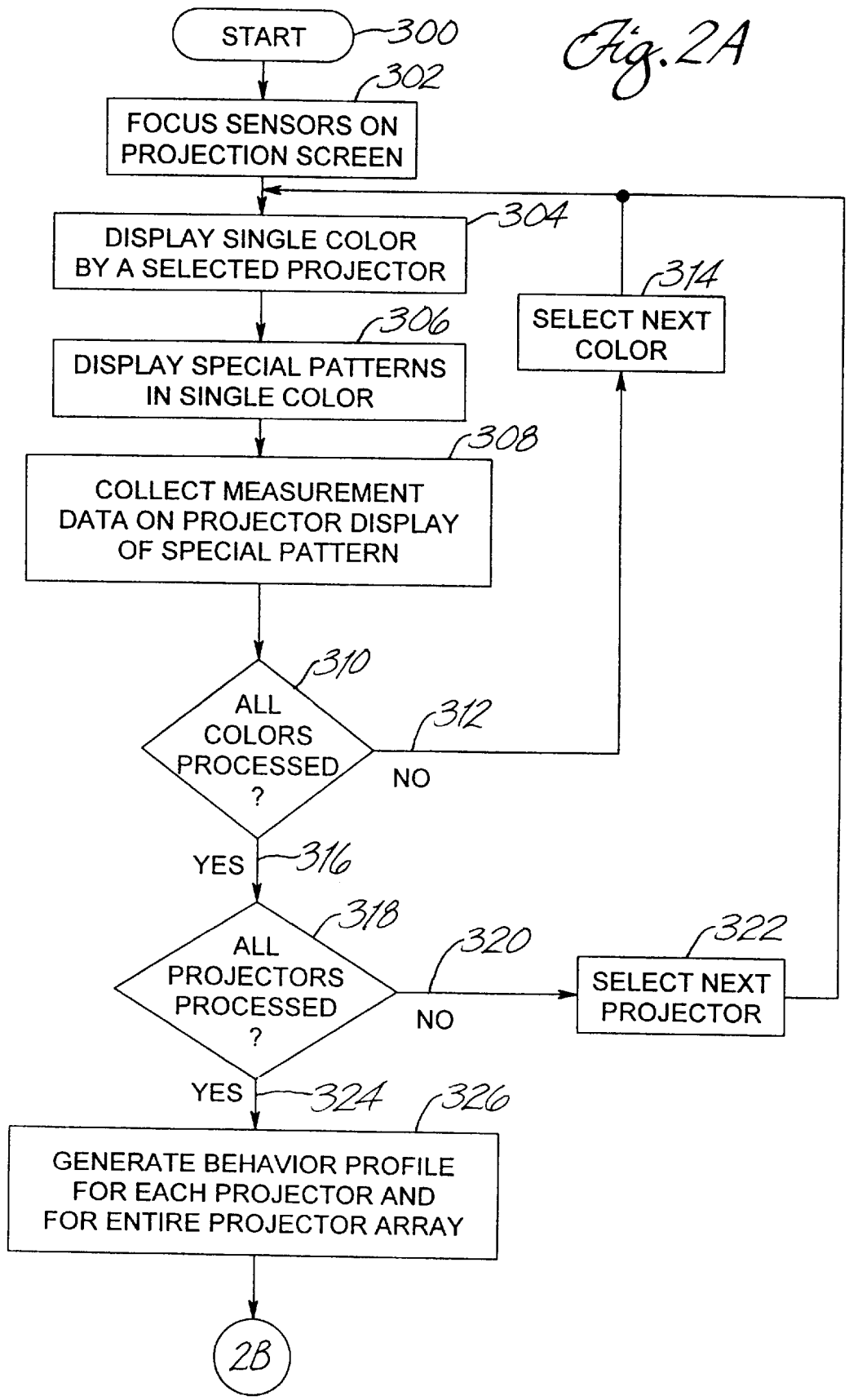

FIGS. 2A and 2B are flow diagrams of the steps of operating the present system for adjusting projectors within a projector array. After Start step 300, one or more light sensors (such as charge-coupled device (CCD) imagers or light meters) are focused on the projection screen at Step 302. Preferably, many light sensors are used to sense the output of the projectors in the projector array at many points on the projection screen. At step 304, the first projector to be analyzed displays a single color (for example, the green part of the image). The system's special patterns are then displayed in the selected single color at step 306. This provides the system with specific information on how the current channel (i.e., the green color channel) of the selected projector is behaving. The measurement data for the projector display of the special pattern is collected at Step 308. This measurement data is also called reflective brightness data. Hence, a database of measurement information is constructed for the sensor data for the current projector. Similar readings are taken for all other channels (i.e., colors) of the current projector. If all colors have not been processed (Test Step 310), then No path 312 is taken to Step 314. At this step, the next color is selected. Steps 304 through 308 for processing a color are then repeated for the new color.

Similar processing takes place for all projectors in the projector array. These operations can be performed serially or in parallel depending on the design of the measuring sensor. If all colors have been processed for a given projector, then Yes path 316 is taken to Test Step 318. If all projectors of the projector array have not been processed, then No path 320 is taken to Step 322. At this step, the next projector in the projector array is selected for processing. Steps 304 through 310 are then repeated for each projector.

If all projectors have been processed, then Yes path 324 is taken to Step 326. At Step 326, a "behavior profile" is generated for each projector, and a "projector array behavior profile" for the entire projector array is generated. These profiles are communicated to the technician making the adjustments to the projectors. Projector matching processing continues with Step 328 on FIG. 2B via connector 2B.

The data presented to the technician in the behavior profiles and the projector array behavior profile are used to make adjustments to the projectors with their native controls (step 328). This gives the technician empirical data on brightness, contrast, and gamma attributes for each of the red, green, and blue channels of the projector array, thereby freeing the technician of the requirement of subjective evaluation of subtle qualities of the projected image. In practice, when the range of adjustment provided by the native projector controls is exhausted, there still may be artifacts remaining that lead to undesirable subtle visual effects. Brightness mismatches at various points on each projector's individual image may show up as "hot spotting" that is caused by the physics of many lens designs, corner brightness aberrations, patches of discontinuous brightness, banding, and other brightness-related artifacts. Therefore, at step 330, selected locations of each projector's output are analyzed to determine solutions to these display problems. This analysis is described further below with respect to projector shading, horizontal color shift correction and correction of optical vignetting.

The graphic analysis of the projectors (which are now set to whatever level of tolerance the technician desires), is used to create a "reflective brightness contour map" at Step 332. The reflective brightness contour map is an analytical model derived from all of the samples gathered as reflective brightness data measurements. This may be displayed as a graphic on a control computer's screen where it can demonstrate important information relating to the projector array to the technician setting up or maintaining the display. From this image, the point on the projection screen, the color, and the degree to which the projectors are mismatched or are in need of brightness refinement may be determined. This map may be created at several resolutions up to the limiting resolution of the overlying smoothing factors lookup table for each color channel of each projector. The reflective brightness contour map is empirical in nature because it is derived independently of any other factors affecting the visual result on the projection screen.

A mathematically inverse map of the reflective brightness contour map is created at Step 334. This inverse map is applied to the smoothing factors lookup table for each color channel of each projector, thereby adjusting the composite projected image, at step 336. This results in modifying areas of the projected image that are brighter than others, thus flattening the brightness of the full projected image. Each color channel of each projector is made compatible with its neighbors and the brightness is now equal from corner to corner, edge to edge, and center to corner of the full projected image. Furthermore, the absolute brightness of each projector's red, green, and blue channels are now identical to their neighboring projectors, thus achieving an extraordinary level of projection matching between adjacent devices in the projector array. This results in a dramatically improved overall appearance of the composite projected image. Projector matching processing ends at End Step 338.

Figure 3:
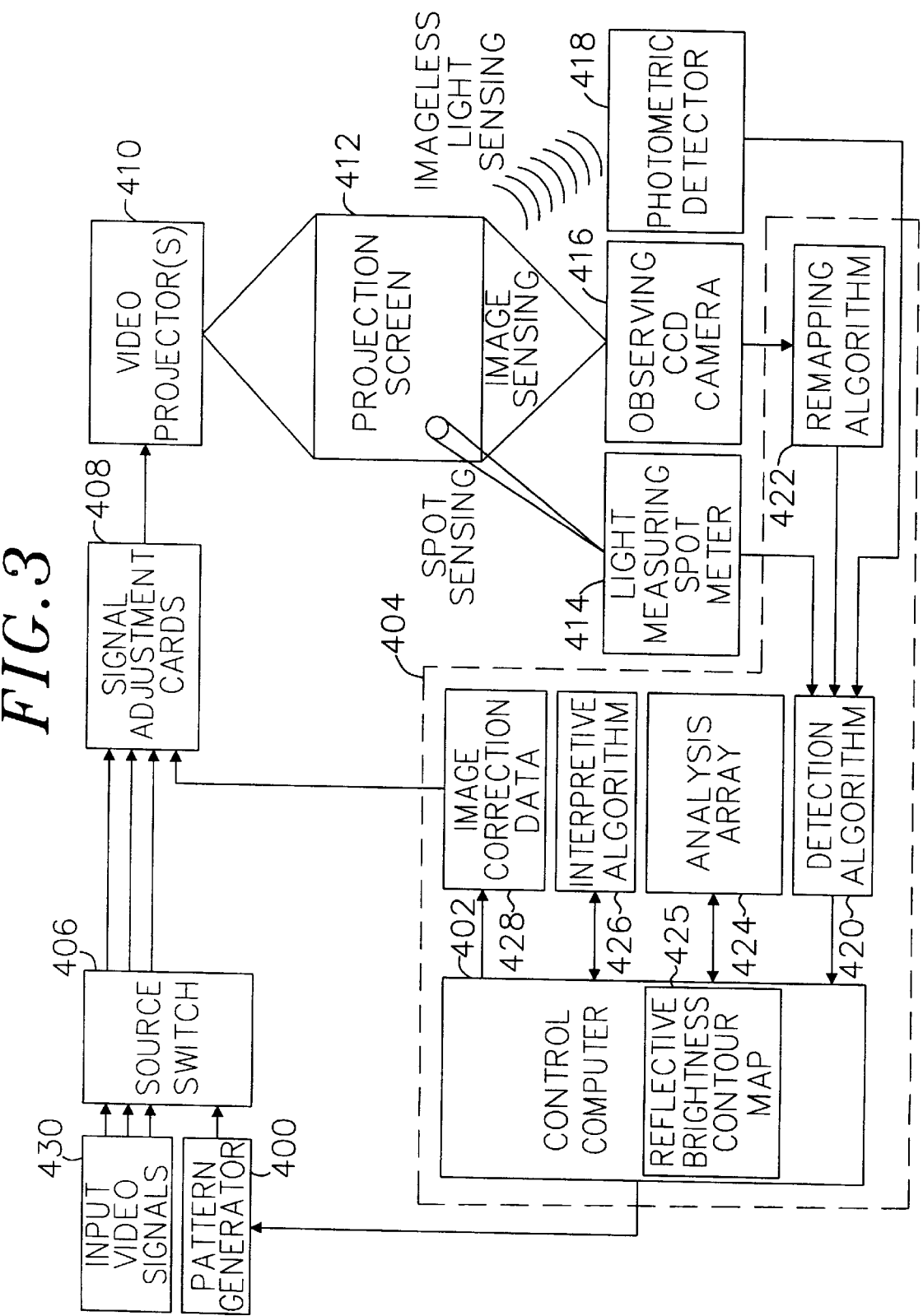
FIG. 3 is a diagram of the system for collecting and analyzing brightness data for multiple projected raster images according to the present invention.

FIG. 3 is a diagram of the system for collecting and analyzing brightness data for multiple projected raster images according to the present invention. Special display patterns are created by pattern generator 400 as directed by control computer 402. Control computer 402 is part of a computer system 404, which may be a general purpose computer or specialized circuitry for performing the functions discussed below. The pattern generator 400 creates the pattern and inputs it through source switch 406 to signal adjustment cards 408. The function and structure of the signal adjustment cards were discussed in detail in relation to FIG. 1. The special pattern signal is sent to one or more video projectors 410. Preferably, a plurality of video projectors are used in an arrayed projection arrangement. The composite image is projected by the video projectors on projection screen 412.

There are at least three methods and corresponding devices that can be used to collect the reflective brightness data by the system. The first method is call "spot sensing". This is performed by using a light measuring spot meter 414 to sense the brightness of the image at a selected location on the projection screen. The spot meter is set to a selected location, a data point of brightness information is collected, and then the spot meter is moved to a different location on the projection screen. This process is repeated for many locations on the projection screen to produce a comprehensive set of reflective brightness data. The second, more sophisticated method, called the "image sensing" method, uses an observing charge-coupled device (CCD) camera 416. The camera is positioned in front of the projection screen and the individual CCDs in the camera obtain reflective brightness data from corresponding points of the image. The array of CCDs in the camera collect the reflective brightness data for the complete projected image.

The third method is called "imageless light sensing". In this method, a photometric detector 418 receives the photons from the projection screen 412 (or any other display area). This step must be done with other illumination sources turned off. With the room containing the projection screen dark, the only photons the sensitive photometric detector may respond to are those resulting from the area of the screen illuminated by the displaying of a special pattern originating with the pattern generator 400. The photometric detector 418 measures the quantity of light while the pattern generator 400 defines the position and original intensity of the light on the projection screen 412.

In all three methods of reflective brightness data collection, the data are forwarded to detection algorithm 420 being executed by computer system 404. The detection algorithm receives the reflected brightness data and assigns it to analysis array 424 in a manner that coordinates the value of the data with the graphic area on the projection screen 412 to which the data corresponds. When the observing CCD camera 416 is used, a remapping algorithm 422 takes the potentially distorted image from the sensing CCD camera 416 and graphically resolves it to the analysis array in a way that allows the value of sampled data points to correspond with the projected raster image. The detection algorithm 420 forwards the collected data to the control computer 402, which stores the collected data as a reflective brightness contour map 425. The control computer then executes an interpretive algorithm 426 to create the mathematically inverse map of the reflective brightness contour map 425 by using the reflective brightness contour map information gathered by the detection algorithm to resolve the reflective brightness contour map to the X,Y screen positions of the array of smoothing factors. This function thereby creates appropriate inverse multiplier numbers, which are written into the appropriate smoothing factor data registers of the inverse map. The inverse map is stored as image correction data 428. The image correction data is, in effect, a smoothing factors lookup table.

The image correction data 428 is used by the signal adjustment cards 408 to adjust the input video signals 430, thereby improving the overall image projected on the projection screen 412 by the video projectors 410.

Figure 4A:
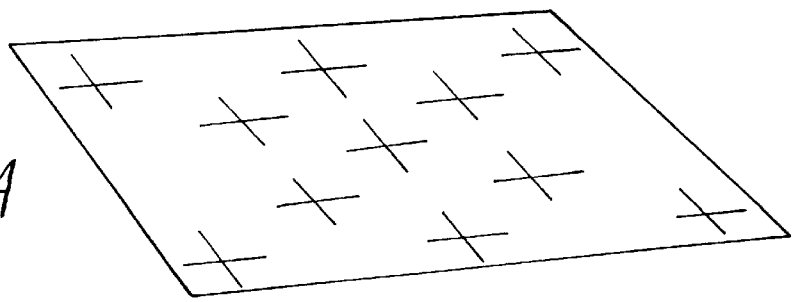
Figure 4C:
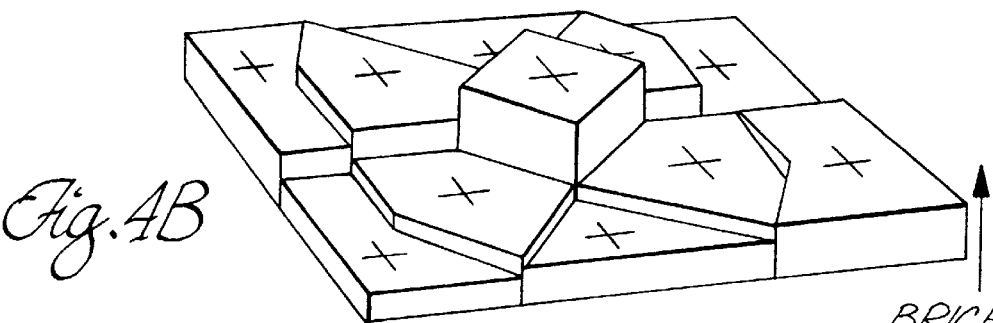
Figure 4C:
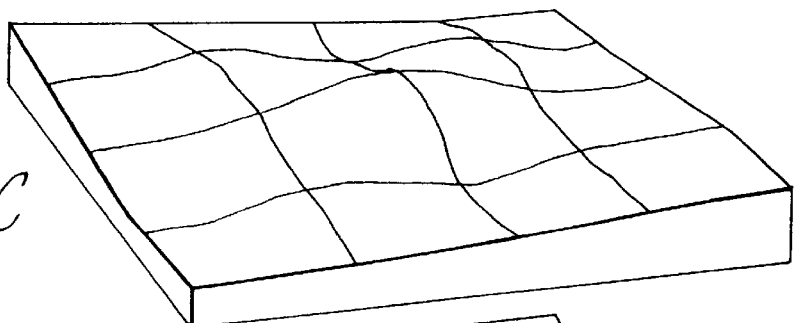
Figure 4D:
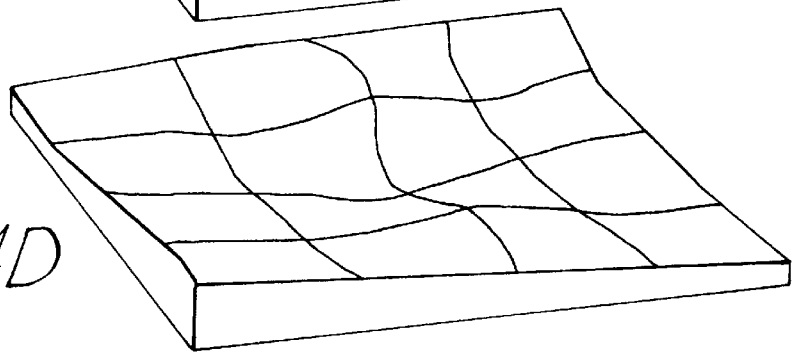
Figure 4E:
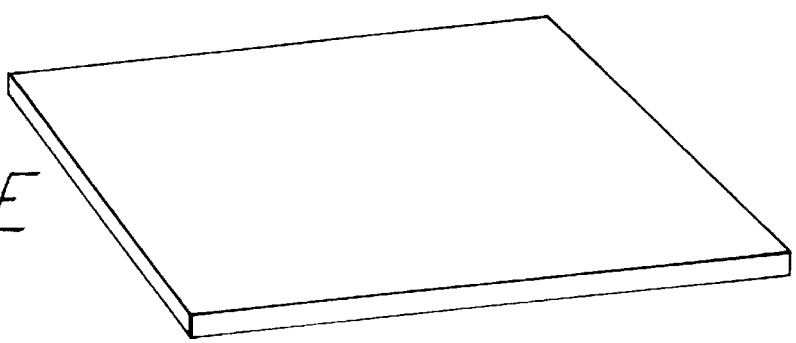

FIGS. 4A–E are diagrams illustrating the concept of projector matching. FIG. 4A shows a representation of the original brightness of an image. The points for making brightness measurements are shown as crosses. Inherently, some areas of the projected image are brighter than other areas. FIG. 4B shows a representation of the reflective brightness data points that are resolved and weighted in an analysis array. From the analysis array, a reflective brightness contour map is generated as shown in FIG. 4C. The reflective brightness contour map shows the brightness peaks and valleys across the actual projected image. An inverse function of the reflective brightness contour map (i.e., the inverse map) is generated as shown in FIG. 4D. The inverse map becomes the array of smoothing factors in the smoothing factors lookup table. The inverse map is applied to the video signals as discussed above. The result of these operations is shown in FIG. 4E. The brightness of the projected image is even across the entire displayed image.

In the system disclosed in the '390 patent, brightness attenuation is the only function derived from the smoothing factors lookup table that overlays each color channel of each projector. However, with the present invention, each element of the smoothing factors lookup table could consist of more than one numerical value, thus allowing the smoothing factors lookup table to contain individual control over brightness, contrast, gamma, and other behavioral characteristics of each projector at any given point of the projected image. Each numerical value in an element of the smoothing factors lookup table would be used to correct a selected attribute of one detail element of the projected image. The discontinuity between the overlaying smoothing factors lookup table and the image's actual resolution may range from a 1:1 relationship (for example) to a relationship of 1:20 or more without impairing the on-screen benefit of large numbers of brightness, contrast, and gamma control points.

In the present invention, a 512 by 512 array is used for two dimensions of the smoothing factors lookup table, thereby providing 262,144 control points to the projected image. Although this is lower in detail than typical 1024 pixel by 1280 pixel computer graphics images (which provide 1,310,720 pixels of image detail), it is much greater than the hundred or so control points of the most sophisticated projection apparatus in the prior art. Of course, larger sized arrays could also be used, thereby providing greater resolution for image adjustment purposes.

Other functions supported by the new smoothing factors lookup table include projector shading, color shift correction, and correction of optical vignetting, the "hot spotting" caused by the physics of projector optics.

III. Projector Shading

All modern cathode ray tube (CRT) based projectors and light valve projectors have shading circuits as part of the basic projector setup electronics. Most of these circuits are simple sawtooth or square wave ramp generators that are applied as analog signals from analog circuits. The purpose of these shading circuits is to provide a flat, even output field from each of the red, green, and blue color channels. Without such circuits, attempts to portray a flat field of a pure color on the projection screen would be flawed by areas of inappropriate brightness or patches of impure coloration. The phenomenon is particularly problematic with light valve projectors wherein molecular thickness variations in the light valves may give rise to complex shading aberrations over the surface. Such local area discontinuities are difficult to relieve through analog means. However, with the present invention, these aberrations can be mapped to the three dimensional smoothing factors lookup table by the method described above.

IV. Color Shift Correction

An embodiment of the present invention supports the correction of horizontal, vertical or geometric color purity shifts. Projectors experience color shifts due to design limitations, optical element misalignments, age or physical limitations. Since the design of a projector involves compromises relating to the cost of manufacture, engineering decisions are sometimes made with less than ideal performance goals in mind. Projectors designed according to such goals may serve the needs of users requiring the display of a single image, but in arrayed projection applications, engineering compromises can result in the production of undesired artifacts in a composite projected image. A typical problem is the phenomenon introduced by prisms inside projectors that are used to split white light into red, green, and blue light for separate construct ion of red, green, and blue light paths. The phenomenon of light color separation is highly dependent on the angle at which the light path intercepts the dichroic surface of the prism or dichroic mirror. Perfect collimation is nearly impossible to achieve, resulting in a slight left to right color shift across the projected image. on a single projection, this may not cause the viewer to detect the artifact. However, with a composite projected image being shown by multiple projectors side by side, the viewer's eyes immediately perceive the mismatching colors, because they are now directly colliding with each other. The color shift problem can be corrected by using the three dimensional smoothing factors lookup table to specifically adjust the brightness across the independent channels of the combined projected images to ensure that the color is constant from projector to projector.

V. Correction of Optical Vignetting

An embodiment of the present invention supports the correction of optical vignetting, also known as "hot spotting." The effects of the physics of projection lenses may cause hot spotting due to limitations on the projection lens designs. This phenomenon is apparent as a brightness decrease from the center of an image to an edge or corner. Given the short focal length of modern electronic projectors, optical vignetting results in noticeable artifacts in an array of projected images. Again, what may appear to be acceptable to a viewer witnessing the output of a single projector may be an obvious aberration for an array projection display. This problem can also be corrected using the three dimensional smoothing factors lookup table to specifically adjust and even out the brightness across the combined projected images to ensure that the brightness is constant, even in the centers of the individual images.

VI. Non-Linear Multiplication Factors

An extension to the three dimensional capability discussed above can be provided to solve the problem of non-linear aberrations. Some projectors, due to design limitations or the nature of the way in which they generate an image or even the effects of aging, mistuning or electronic shortcomings, may treat incoming shaded areas in ways that do not allow the linear effect of blending the electronic signal to effectively produce a linear physical result in the brightness portrayed on the screen. For such projection devices, additional compensation is needed.

In the physics of the projection, an electronic signal is translated into a physical result. One might think of the range of voltages going into a display device as that which an ideal projection device would translate into a corresponding range of photon populations on the screen. Given a signal of zero to one volt in the source, the photon count might be translated into a range of zero to X billion photons per square millimeter (p/mm2) on the screen (each second). A voltage of 0.5 volt would produce exactly X/2 billion p/mm2; a voltage of 0.1 volt would produce X/10 billion p/mm**2, and so on.

Unfortunately for the ideal, this often is not the case. Such projectors as light valves, phosphors bombarded by electrons, liquid crystal devices, and micro mirrors all exhibit deviations from the ideal. When the flaws in linearity are minimized, the human visual system accepts the compromised image and no problem is detected. When overlapping flawed linearities are attempted to be blended, visible results may be perceived in an unforgiving way. Since a combination of two signals are used to create a blended area in the present system, manipulation here offers a straightforward opportunity to correct for general linearity flaws.

As explained above, the present system electronically manipulates detail elements of the image by attenuating the brightness of the video. These brightness parameters (or smoothing factors) are created with a range of attenuation levels, with zero being complete attenuation and an attenuation maximum level being no attenuation. The smoothing factors are applied to the underlying video signal to create the blended image. At this point there is an opportunity to introduce a new factor called a non-linear multiplication factor (NLMF) to the value of the degree of attenuation the smoothing factor represents. This NLMF would affect lower voltages differently from the way in which it would affect higher voltages. Higher voltages (i.e., brighter elements) would be diminished in voltage more strongly than lower voltages (i.e., darker elements). Hence, the value of the smoothing factor can be adjusted based on the variable intensity of the video input signal.

Figure 5A:
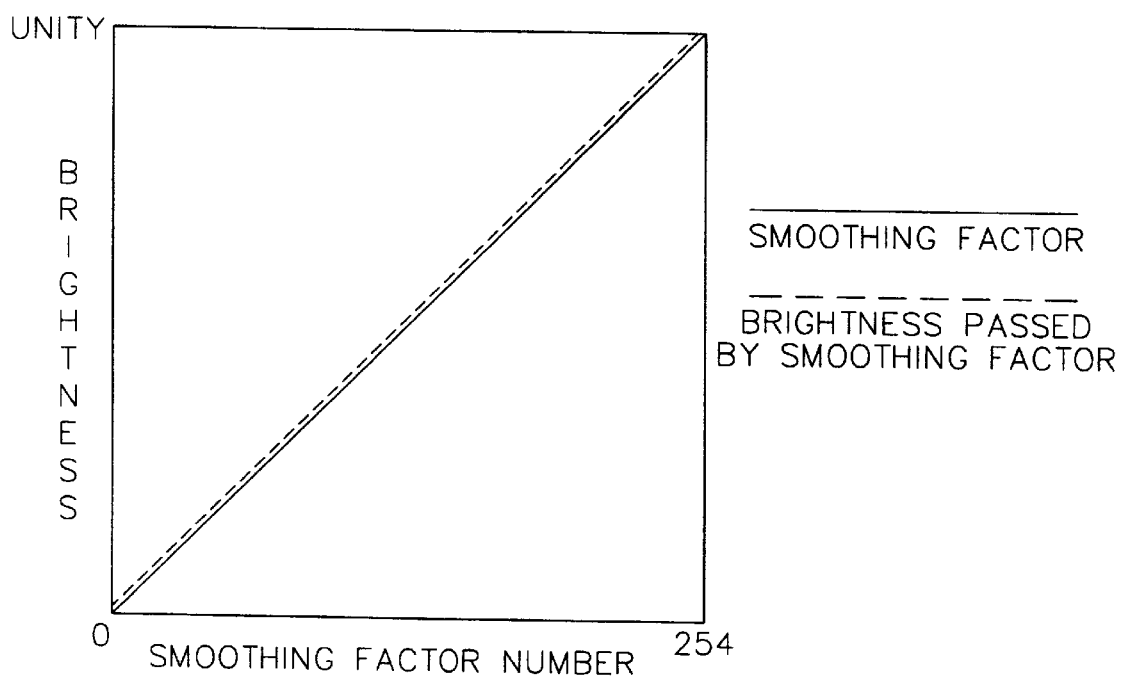
FIGS. 5A–B are diagrams illustrating linear vs. non-linear multiplication factors.
Figure 5B:
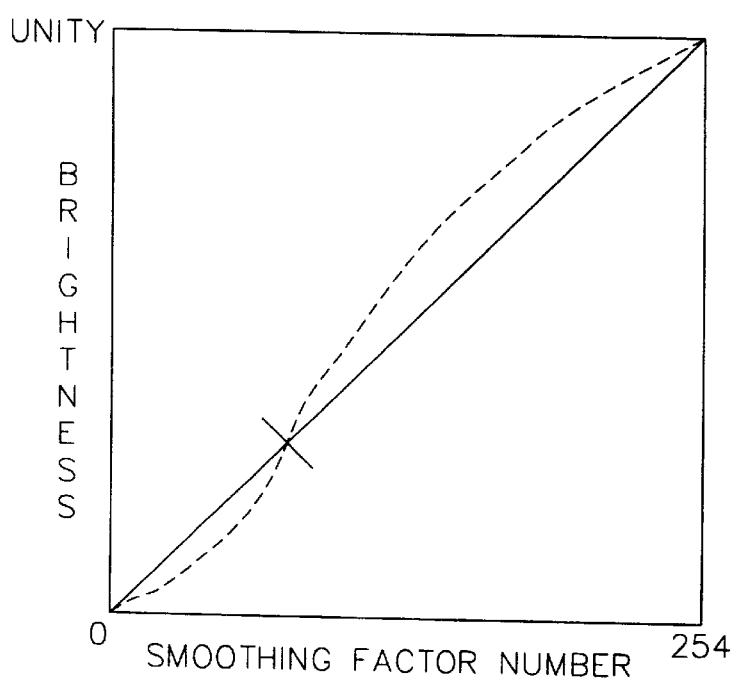

Overlapped areas with a NLMF applied could thus better control the effect a single smoothing factor has over program material of any brightness. For example, use of two control parameters in the range 0 to 255, a NLMF at the #255 end of the smoothing factor curve and a NLMF at the #128 smoothing factor value on a smoothly transitioning basis (ending in a multiplication factor of 1.0 at the #0 end of the smoothing factor curve), would produce profound results in blending control. FIGS. 5A and 5B are diagrams showing the relationship of image input strength as modified by linear and non-linear multiplication factors. A linear multiplication factor as shown in FIG. 5A generates a mathematically linear result on the projection screen from an ideal projector. A non-linear multiplication factor creates a proportional change on the underlying image signal as shown in FIG. 5B.

Additionally, given that projectors already exhibiting non-linear electronic input to photonic output ratios currently are in use, an adjustable linear multiplication factor would serve these devices well. Here, a simple adjustable factor of multiplication (e.g., 0.3 to 3.0) would be introduced as needed for any given channel of any given projector design. Where projector designs fail to attenuate the upper brightness range in a linear manner, a factor of 1.5 would tend to assist the blend achieved by matching areas of lower brightness. Where a brighter image area showed darker effects even though middle and lower brightness areas looked correct, a linear multiplication factor of 0.8 would help by not diminishing the brightness as much.

VIII. Modifications of Smoothing Factors

Although a particular algorithm for generation of the smoothing factors was disclosed in the '390 patent at column 8, an automatic approach could also be used. For example, the smoothing factors generated by the algorithm could be calibrated to the actual behavioral linearity of the projector or imaging device to get better results. A signal generator and a light meter or other detector can be used to monitor the phosphor output of the imaging device and provide automatic feedback for the generation of the smoothing factors. By automatically measuring the response of the system, the smoothing factors can be adjusted without human intervention.

The above approaches to smoothing factor adjustments rely on static changes. A dynamic adjustment can also be used to further refine the smoothing method and produce even better results. Another input to the smoothing circuitry is gathered from a digitization of the output of a sensor detecting the brightness of the video image content. The system may switch "on the fly" or dynamically to a different smoothing curve or set of smoothing factors based on dynamic changes in the content of the actual video image signal.

Similarly, a series of smoothing factors may be compiled and used at specific points in a visual media presentation that follows a regular time base such as a multi-source video presentation or any pre-composed, prepared or time-locked group of appropriate video sources. For these cases, specific smoothing factors lookup tables are accessed and inserted into the image stream at specific points in time, their effect being synchronized to adjust desired projected images in the video presentation. Smoothing factors based on timed events may be fed as data from computers, video sources, clocks, time codes, and parallel synchronized lists. Changes of smoothing factor sets are made in synchronicity with the program material being displayed by an array of projectors.

IX. Automatic Edge Definition of Multiple Projected Images

An embodiment of the present invention supports a feature called "automatic edge definition." Performance of automatic edge definition is made possible by the three dimensional smoothing factors lookup table of the present invention. Automatic edge definition is a method of determining the appropriate edge of an image where the raster is not of the typical square or rectangular configuration. This method is useful when the projection shape is trapezoidal, hexagonal, or consists of an arbitrary projection area. These projection areas may exist as a definable subset of pixels that lie within a rectangular raster image, but there is no inherent intelligence in a projection device that can mask out areas of the image that should be eliminated from the projection.

The present invention supports the arrayed projection of odd-shaped images. There are at least two methods of capturing the shape information. In the first method, the picture shape is defined by a user selecting the boundaries of the picture using a cursor superimposed over the projected image. This point to point map is saved in a smoothing factors lookup table. For each point in the raster image that is not part of the displayed picture, a smoothing factor of zero value is stored in the smoothing factors lookup table element associated with that point on the screen. For each point on the raster that is part of the desired image, a smoothing factor of maximum value is stored. This allows the underlying image at that point to be displayed.

Another method of defining a complex shape for a projected image is to use an external pattern generator, video signal or graphic computer display as a passive or dynamic trigger of the masking effect. The brightness level of the incoming signal is analyzed with, for example, dark areas detected as zero smoothing factors and light areas detected as full smoothing factors. Adjustment of light and dark factors areas may be according to a predetermined threshold (and thus adjustable or by continuous function), thus giving rise to areas of semi-transparency triggered by density of the input signal.

With either method of shape definition, the final display is the same. The horizontal and vertical elements of the raster image are placed subordinate to the pattern held by two dimensions of the smoothing factors lookup table. Where the lookup table element is zero, no active image passes to the projector. Where the lookup table element contains a full brightness smoothing factor, the transfer of the image is unimpeded. Where intermediate values are stored, proportionately attenuated portions of the underlying image are passed to the projector. With the present invention, adjacent irregular, non-rectangular images may be blended together forming seamless, continuous display images on curved, spherical, geometrically dimensional, and irregular surfaces.

While various embodiments of the invention have been particularly shown, it will be understood by those skilled in the art that various changes in form and detail may be made without departing from the scope and spirit of the present invention.

What is claimed is:

1. A system for adjusting video signals representing an array of raster images to compensate for projection defects comprising:
   a plurality of projectors to display the array of raster images, each raster image including red, green and blue color components, to form a composite projected image;
   a three dimensional array of smoothing factors, each smoothing factor being associated with a portion of the composite projected image; and
   means for applying the smoothing factors to the video signals to remove the projection defects resulting from display of the array of raster images, wherein the three dimensional array of smoothing factors comprises a smoothing factor for each portion of the composite projected image for each of red, green, and blue color signals of the video signals, and wherein each smoothing factor is applied to a selected portion of the composite projected image by multiplying the smoothing factor with video signal values for the selected portion.

2. The system of claim 1, wherein the applying means comprises means for edge blending of adjacent overlapping raster images.

3. The system of claim 1, wherein the applying means comprises means for matching color outputs of the projectors displaying the array of raster images.

4. The system of claim 1, wherein the applying means comprises means for correcting occurrences of improper projector shading for the projectors by applying the smoothing factors.

5. The system of claim 1, wherein the applying means comprises means for correcting occurrences of horizontal, vertical, or geometric color purity shifts for the projectors by adjusting the brightness of the composite projected image according to the smoothing factors.

6. The system of claim 1, wherein the applying means comprises means for correcting occurrences of optical vignetting for the projectors by adjusting the brightness of the composite projected image according to the smoothing factors.

7. The system of claim 1, wherein the applying means comprises means for applying the smoothing factors non-linearly to adjust selected portions of the composite projected image which are brighter to be diminished more strongly than selected portions of the composite projected image which are darker, thereby adjusting the value of the smoothing factors based on a variable intensity of the video signals for the selected portions.

8. The system of claim 1, wherein the applying means comprises means for automatically generating the smoothing factors based on dynamically monitoring output of the projectors.

9. The system of claim 1, wherein the applying means comprises means for automatically generating the smoothing factors at specific times determined according to a regular time base of multi-source video sources providing the video signals.

10. The system of claim 1, wherein the applying means comprises means for determining edges of the composite projected image when the composite projected image is not square or rectangular in shape and for displaying the composite projected image within the determined edges.

11. A system for adjusting video signals representing an array of raster images to compensate for projection defects comprising:
    a plurality of projectors to display the array of raster images, each raster image including red, green and blue color components, to form a composite projected image;
    means for storing a three dimensional array of smoothing factors, each smoothing factor being associated with a portion of the composite projected image; and
    means for applying the smoothing factors to the video signals to remove the projection defects resulting from display of the array of raster images, wherein the applying means comprises:
    a brightness circuit to adjust the brightness of the video signals;
    a mixer coupled to the brightness circuit; and
    a smoothing factor multiplier coupled to the mixer and the storing means to apply the smoothing factors to video signals used for generating the composite projected image.

12. The system of claim 11, further comprising a gamma circuit coupled to the mixer to adjust the gamma of the video signals.

13. The system of claim 12, further comprising a contrast circuit coupled to the mixer to adjust the contrast of the video signals.

14. A method of matching arrayed projectors to produce a composite raster image having consistent red, green, and blue color values, comprising the steps of:
    (a) focusing at least one light sensor on the projection screen;
    (b) displaying a selected one of the color values by a selected one of the projectors on the projection screen;
    (c) displaying a pattern of the selected color value by the selected projector on the projection screen;
    (d) collecting measurement data from the at least one light sensor sensing the display by the selected projector of the pattern;
    (e) repeating steps (b)–(d) for each of the color values;
    (f) repeating steps (b)–(e) for each of the projectors;
    (g) generating a behavior profile for each of the projectors and for all projectors combined from the collected measurement data; and (h) adjusting the projectors according to the behavior profiles,
    wherein the composite rater image comprises a plurality of raster images, each of the plurality of raster images includes red, green and blue color components, and each raster image is projected on a projection screen by one of the arrayed projectors.

15. The method of claim 14, further comprising the steps of:
    (i) analyzing selected locations of each projector's projected raster image;
    (j) creating a reflective brightness contour map representing the reflective brightness of the composite raster image;
    (k) creating an inverse map of the reflective brightness contour map; and
    (l) applying the inverse map to the composite raster image.

16. The method of claim 15, wherein the reflective brightness contour map comprises a three dimensional array of smoothing factors.

17. The method of claim 15, wherein the inverse map comprises a three dimensional array of smoothing factors.

18. A system for producing a composite raster image having consistent red, green, and blue color values, the system comprising:
    arrayed projectors to project the composite raster image on a projection screen;
    at least one light sensor sensing the composite raster image on the projection screen;
    means for displaying selected color values by selected projectors on the projection screen;
    means for displaying patterns of selected color values by selected projectors on the projection screen;
    means for collecting measurement data from the at least one light sensor sensing the display by the selected projector of the patterns;
    means for generating a behavior profile for each of the projectors and for all projectors combined from the collected measurement data; and
    means for adjusting the projectors according to the behavior profiles,
    wherein the composite raster image comprises a plurality of raster images, each of the plurality of raster images includes red, green and blue color components, and the arrayed protectors are matched to provide the consistent red, green, and blue color values to the composite raster image.

19. The system of claim 18, further comprising:
    means for analyzing selected locations of each projector's projected raster image;
    means for creating a reflective brightness contour map representing the reflective brightness of the composite raster image;
    means for creating an inverse map of the reflective brightness contour map; and
    means for applying the inverse map to the composite raster image.

20. The system of claim 19, wherein the reflective brightness contour map comprises a three dimensional array of smoothing factors.

21. The system of claim 19, wherein the inverse map comprises a three dimensional array of smoothing factors.

22. The system of claim 19, wherein the applying means comprises a signal adjustment card for each of the projectors.

23. The system of claim 19, wherein the signal adjustment card comprises:
    a brightness circuit to adjust the brightness of the video signals;
    a mixer coupled to the brightness circuit;
    means for storing the inverse map; and
    a smoothing factor multiplier coupled to the mixer and the storing means to apply the inverse map to video signals used for generating the composite raster image.

24. The system of claim 23, further comprising a gamma circuit coupled to the mixer to adjust the gamma of the video signals.

25. The system of claim 23, further comprising a contrast circuit coupled to the mixer to adjust the contrast of the video signals.

26. The system of claim 18, wherein the at least one light sensor comprises a light measuring spot meter.

27. The system of claim 18, wherein the at least one light sensor comprises a CCD camera.

28. The system of claim 18, wherein the at least one light sensor comprises a photometric detector.

* * * * *